(12) United States Patent　　(10) Patent No.: US 8,960,085 B2
Smith et al.　　(45) Date of Patent: Feb. 24, 2015

(54) CAMERA FOR MONITORING FUNCTIONS OF A ROUND BALER

(75) Inventors: David C. Smith, Ottumwa, IA (US); Alexander B. Cook, Ottumwa, IA (US)

(73) Assignee: Deere & Company, Moline, IL (US)

( * ) Notice: Subject to any disclaimer, the term of this patent is extended or adjusted under 35 U.S.C. 154(b) by 134 days.

(21) Appl. No.: 13/289,353

(22) Filed: Nov. 4, 2011

(65) Prior Publication Data

US 2013/0112094 A1　　May 9, 2013

(51) Int. Cl.
*A01F 15/08*　　(2006.01)
*A01F 15/14*　　(2006.01)

(52) U.S. Cl.
CPC .............. *A01F 15/08* (2013.01); *A01F 15/0833* (2013.01); *A01F 15/148* (2013.01)
USPC .............................................. 100/88; 56/341

(58) Field of Classification Search
USPC ......... 56/341, 10.2 R, 10.2 A, 10.2 C, 10.2 J, 56/DIG. 7, DIG. 15; 100/87, 88, 89; 701/36, 50
See application file for complete search history.

(56) References Cited

U.S. PATENT DOCUMENTS

| 7,640,721 | B2* | 1/2010 | Viaud et al. ..................... 56/341 |
| 2003/0025599 | A1* | 2/2003 | Monroe ........................ 340/531 |
| 2003/0081120 | A1* | 5/2003 | Klindworth ................... 348/143 |
| 2003/0081123 | A1* | 5/2003 | Rupe ............................. 348/148 |
| 2008/0028353 | A1* | 1/2008 | Lu et al. ......................... 716/13 |
| 2008/0228353 | A1* | 9/2008 | Mayfield et al. ................ 701/41 |
| 2009/0107102 | A1* | 4/2009 | Biziorek ........................ 56/341 |
| 2009/0249746 | A1* | 10/2009 | Viaud ............................. 53/399 |
| 2010/0063690 | A1* | 3/2010 | Madsen ........................ 701/50 |
| 2011/0191001 | A1* | 8/2011 | Viaud ............................. 701/99 |

* cited by examiner

*Primary Examiner* — Jimmy T Nguyen
*Assistant Examiner* — Onekki Jolly
(74) *Attorney, Agent, or Firm* — Quarles & Brady LLP

(57) ABSTRACT

A system is provided to utilize one or more video cameras placed proximal to one or more operating systems of a round baler and one or more signals on the baler to switch screens on a display to display video during bale ejection, crop feeding, twine or net wrapping and back up. The display switches screens back to other baler application when for example the ejection cycle is completed, the wrapping cycle is completed etc. This allows an operator to visually monitor various baler functions while facing forward and without the need to manually change setting on the display.

20 Claims, 1 Drawing Sheet

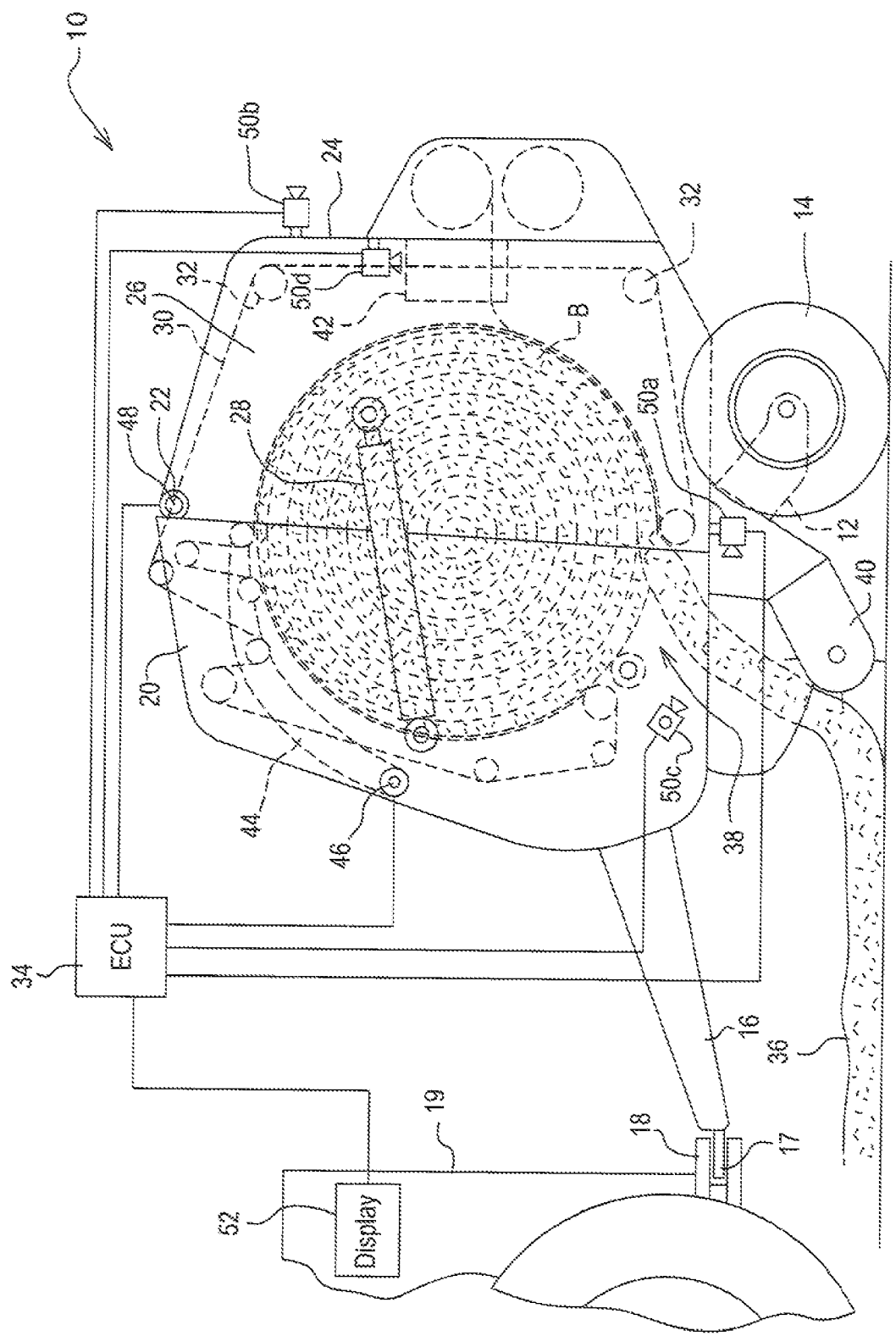

CAMERA FOR MONITORING FUNCTIONS OF A ROUND BALER

FIELD OF THE DISCLOSURE

The disclosure relates generally to agricultural balers. More particularly, the disclosure relates to agricultural balers that produce large cylindrical bales, commonly referred to as round balers. Specifically, the disclosure relates to a round baler equipped with one or more cameras to monitor one or more functions of the baler.

BACKGROUND OF THE DISCLOSURE

When a bale is ejected from a round baler there is a possibility that it will not roll clear of the gate, preventing the gate from closing and preventing further operation until the bale is clear and the gate is closed. The bale could also become stuck in the baler or roll down a hill. Current solutions include a bale push bar and/or a bale ramp. A bale push bar is linked to the gate and will push the bale away from the baler as the gate is raised. This can cause the bale to roll and can cause problems on uneven terrain. A bale can also be slow to fall from the chamber in which case the push bar will get stuck on the opposite side of the bale and prevent the bale from clearing the gate. A bale ramp provides a slope down from the baler to create momentum on the bale so that it rolls clear of the baler. This can cause the bale to roll and cause problems on uneven terrain. If the bale is ejected on a hill both a push bar and a ramp may not be enough to keep the bale from rolling back into the path of the baler gate. Operators will frequently position the tractor almost perpendicular to the baler to see the bale as it is ejected.

Additionally, the net or twine feeding system can experience mis-feeds from time-to-time and it would be useful to the operator to be aware of possible mis-feeds before problems occur. It is further desirable to have visibility of the quantity of net or twine available in the baler prior to a beginning the wrapping cycle to ensure that a sufficient quantity of wrapping material is available to complete the wrapping operation.

It is further desirable to have the capability to monitor the crop feeding system of the baler to ensure that crop is feeding properly and that the baler is not subject to plugging of the feed system.

It is also desirable to have a view behind the baler when backing up the tractor-baler combination to avoid obstacles and to avoid uneven terrain etc.

SUMMARY OF THE DISCLOSURE

It is therefore an object of the disclosure to provide a system for monitoring various functions of the baler which is automatically displayed to the operator at desired times during the baling operation.

It is another object of the disclosure to provide such a system that requires less direct action from the operator than known systems.

It is a further object of the disclosure to provide such a system that is compatible with known baling equipment and techniques.

It is a yet another object of the disclosure to provide such a system that is inexpensive to fit and retrofit to new and existing balers alike.

Objects of the disclosure are accomplished by an agricultural round baler having at least one operating system, the baler comprising: at least one camera disposed for monitoring the at least one operating system; means for sensing an actuation of the at least one operating system; a display configured for selectively displaying a video from the at least one camera in response to sensed actuation of the at least one operating system.

In general a system is provided to utilize one or more video cameras placed proximal to one or more operating systems of a round baler and one or more signals on the baler to switch screens on a display to display video during bale ejection, crop feeding, twine or net wrapping and back up. The display switches screens back to other baler applications when for example the ejection cycle is completed, or the wrapping cycle is completed etc. This allows an operator to visually monitor various baler functions while facing forward and without the need to manually change settings on the display.

After a round bale is formed and wrapped in a round baler the bale needs to be ejected. The round baler gate is opened allowing the bale to fall and roll out of the baler. The round baler is equipped with a camera that sends video to a monitor in a tractor. By utilizing sensors on the baler (gate latch switches to indicate if the gate is opened or closed, a gate position sensor which indicates a percentage of how open the baler gate is, or any other sensor or switch) the monitor can receive a signal that tells it to switch from the baler application or screen to a screen that shows video from the camera to see if the bale has been properly ejected and is clear of the baler gate. As the gate is closed a signal will be sent to the monitor to switch back to the baler application or screen from the screen showing the video from the camera.

This idea can be used in multiple applications on a round baler as well as on any piece of machinery. By utilizing a signal from a piece of machinery a monitor can automatically switch to a video feed of any area of interest during a critical time and switch back when the video feed is no longer needed.

Net Feeding Camera: An ECU can tell the monitor that a tie cycle has started. During a net tying cycle, the display switches to show a video from a camera that is positioned such that the net can be seen going onto the bale. The monitor could switch back to the baler application after a certain amount of time or from a sensor or switch.

Twine Feeding Camera: A controller can tell the monitor that a tie cycle has started.

During a twine tying cycle, the display switches to show a video from a camera that is positioned such that the twine can be seen going onto the bale. The monitor could switch back to the baler application after a certain amount of time or from a sensor or switch.

Pickup or Feeding System Camera: The display switches to show a video of the crop feeding into the baler. The display could also switch when a controller tells the monitor that the baler is plugged. The ECU will know the baler is plugged by utilizing sensors on the baler.

Backup Camera: A camera can be positioned on the baler that shows the area behind the baler. When the tractor is put in reverse, the display can show the video feed and automatically switch back when the tractor is put back into a forward gear.

Net Low Indication: A camera can be positioned on the baler such that it sees the roll of netwrap that is used to wrap the bale before it is ejected. It can cause a significant delay if a baler runs out of netwrap and ejects a bale that is not tied. The baler can send a signal to the display to switch to a video feed of the netwrap roll at the start of a tie cycle so the operator can see if there is any net left. This could be set to reoccur after a certain number of bales.

BRIEF DESCRIPTION OF THE DRAWINGS

The embodiments of the disclosure are described in detail below with reference to the single drawing FIGURE depicting a partially schematic side view of a round baler according to the disclosed system.

DETAILED DESCRIPTION OF THE DRAWINGS

With reference to the drawing FIGURE it can be seen that an agricultural round baler 10 has a main frame 12 supported on a pair of ground wheels 14. A draft tongue 16 has a rear end joined to the frame 12 and has a forward end defined by a clevis arrangement 17 adapted for being coupled to the drawbar 18 of a tractor 19. A pair of upright side walls 20 are fixed to the main frame 12 and define forward regions of opposite side walls of a baling chamber. Mounted for pivoting vertically about a horizontal pivot arrangement 22 located at an upper rear location of the side walls 20 is a discharge gate 24 including opposite upright side walls 26, which define opposite sides of a rear region of the baling chamber. A gate cylinder arrangement 28 is coupled between the main frame 12 and the opposite side walls 26 of the discharge gate 24 and is selectively operable for moving the discharge gate 24 between a lowered baling position and an opened discharge position. Baler 10 as shown is of a variable size chamber design and thus comprises a plurality of longitudinally extending side-by-side belts 30 supported on a plurality of rollers 32 (only a few of which are shown). A bale forming chamber is defined by the sidewalls 20, 26, the rollers 32 and belts 30. At least one electronic control unit (ECU) 34 is provided for electronically controlling the functions of the baler 10. The ECU 34 is configured to receive signals from various sensors on the baler for example to determine bale diameter, bale shape, bale weight, etc. and for initiating various baler functions such as the tying or wrapping cycle, bale ejection, opening the gate etc.

In its general operation the baler 10 is drawn through a field by the tractor 19 (not fully shown) attached to the tongue 16. Crop material 36 is fed into a crop inlet 38 of the bale forming chamber from a windrow of crop on the ground by a pickup 40. In the baler 10, the crop material 36 is rolled in spiral fashion into the cylindrical bale B. Upon completion, the bale B is wrapped with twine or other appropriate wrapping material via a twine or net feed and cut-off system 42, not shown in detail, and is discharged by actuation of gate cylinders 28 that open gate 24 permitting the completed bale B to be discharged from the baler 10 onto the ground. As mentioned previously, the baler 10 illustrated is a variable chamber design wherein crop is rolled up in a spiral fashion in a nip formed between oppositely moving adjacent loops of belts 30. The space between adjacent loops of belts 30 grows as the forming bale B grows larger. Accordingly, a belt tensioning device 44 is provided to take up slack in the belts 30 as needed. Thus the position of the tensioning device 44, at any given time, is an indication of the size of the bale B at that time. A bale diameter sensor 46 in the form of a potentiometer is affixed to the pivot point of the tensioning device 44 and thus provides an electrical signal correlating with bale diameter to the ECU 34. The ECU 34, via appropriate logic, can then translate the signal into meaningful bale size data that can be communicated to an operator by way of an appropriate display device (not shown). In addition to providing an indication of bale size to the operator, the ECU 34 can be adapted to utilize bale diameter data for other purposes such as triggering a twine or wrapping cycle, opening the discharge gate, initiating bale discharge, or to control the application of preservative to the bale. Further a gate position sensor 48 is provided. As shown the gate position sensor 48 is associated with the pivot arrangement 22 of the gate 24 and thus could be in the form of a rotary potentiometer. It is however, contemplated that a variety of other suitable arrangements of sensors could be used to sense the position of the gate 24. The gate position sensor 48 is in wired or wireless communication with the ECU. The baler illustrated is an example of a variable chamber baler however it should be understood that the baler could be of a fixed chamber design.

The description thus far has been directed to the construction and operation of a conventional round baler. The description that follows describes the improvements to such a baler as contemplated by this disclosure. More particularly, it can be seen that a camera 50a is affixed to a lower portion of the gate 24. The camera 50a is in communication with the ECU 34. A display 52 is further in communication with the ECU 34 and is configured to selectively display a video image from the camera 50a. The display 52 is preferably located in an operator station of a tractor 19 to allow an operator to view it. The ECU 34 is configured to switch the display 52 from a display of other functions of the baler to the video from the camera 50a when the gate position sensor 48 indicates that the gate 24 is being opened for bale discharge. The operator now has the opportunity to view the bale as it is discharged from the baler 10. When the gate position sensor 48 indicates that the gate 24 is again closed the ECU 34 switches the display 52 to display other functions.

Alternatively or additionally, a camera 50b is mounted on the rear of the gate 24 to enable the operator to selectively view the area behind the baler 10 particularly when the baler is being backed up. The ECU 34 is in communication with the camera 50b and the display 52 to selectively display the image from the camera 50b when the tractor is reversed.

Alternatively or additionally, a camera 50c is located proximal to the cop inlet 38 to enable the operator to selectively view the flow of incoming crop 36 into the baler 10 as well as the operation of the pickup 40. The ECU 34 is in communication with the camera 50c and is configured to periodically switch the display 52 to the video signal from the camera 50c to allow the operator to view the incoming crop or to display the video from the camera 50c when a plug is detected in or near the crop inlet 38.

Alternatively or additionally, a camera 50d is located proximal to the net or twine feeding and cut-off system 42. The camera 50d is in communication with the ECU 34 which can selectively switch the display 52 to the video from the camera 50d in response to signal provided to the ECU that the net or twine feed and cut off mechanism 42 has been actuated. This camera 50d can provide to the operator an indication as to whether the net or twine feed and cut off mechanism 42 is functioning properly and/or provide a view of the remaining net or twin available for wrapping.

It is further contemplated that the ECU 34 can be configured to selectively and/or continually shift the display 52 to sequentially view the video from each of the cameras 50 to allow the operator to have a view of each system during the baling process. It is also contemplated that the display 52 could be configured to simultaneously display the video from each camera 50 in a split screen configuration, or to use a split screen configuration to display both a video from one or more cameras 50 along with conventional visual displays of baler data such as bale size and shape, number of bales completed, bale weight, moisture content etc.

In view of the foregoing it can be seen that the disclosed system accomplishes the objects of the disclosure in that it provides a system for monitoring various functions of the baler which is automatically displayed to the operator at desired times during the baling operation. Because the ECU automatically shifts the display at appropriate times the system requires little direct action from the operator than known systems. Similarly, because the system can use readily available and inexpensive video cameras along with a reprogramming of the ECU software the system is compatible with known baling equipment and techniques and is inexpensive to fit and retrofit to new and existing balers alike.

Having described the preferred embodiment, it will become apparent that various modifications can be made without departing from the scope of the disclosure as defined in the accompanying claims.

What is claimed is:

1. An agricultural round baler, comprising:
   a baler housing defining a bale forming chamber;
   a plurality of baler operating systems mounted to the baler housing, each baler operating system being different from other of the plurality of baler operating systems;
   a plurality of cameras mounted to the baler housing and positioned to view the plurality of baler operating systems; and
   a control system including:
      a controller;
      a display operatively coupled to the controller and the plurality of cameras; and
      a plurality of sensors mounted to the baler housing and operatively coupled to the controller, the plurality of sensors sensing the actuation of the plurality of baler operating systems or detecting an error with one of the plurality of baler operating systems;
   wherein the control system is configured to display a baler application screen on the display, and wherein, upon activation of a first of the plurality of baler operating systems, the control system is configured to detect one or more signals from a corresponding first of the plurality of sensors and switch the display from displaying the baler application screen to displaying video from a corresponding first of the plurality of cameras during actuation of the first baler operating system, and upon termination of the first of the plurality of baler operating systems, switch the display from displaying the video from the first of the plurality of cameras to displaying at least one of the baler application screen and video from another of the plurality of cameras; and
   wherein, upon activation of a second of the plurality of the baler operating systems, the control system is configured to detect one or more signals from a corresponding second of the plurality of sensors and switch the display from displaying the second baler operating system, and upon termination of the second of the plurality of baler operating systems, switch the display from displaying the video from the second of the plurality of cameras to displaying at least one of the baler application screen and video from another of the plurality of cameras.

2. The agricultural round baler of claim 1, wherein at least one of the plurality of cameras is mounted to an interior of the baler housing.

3. The agricultural round baler of claim 2, wherein one of the plurality of baler operating systems is a pickup at a crop inlet for feeding crop material into the bale forming chamber.

4. The agricultural round baler of claim 3, wherein the control system is configured to switch the display from displaying the baler application screen to displaying a video of the crop inlet when one of the plurality of sensors detects a plug in the crop inlet, and upon termination of the sensor detecting the plug in the crop inlet, switches the display from displaying the video of the crop inlet to displaying at least one of the baler application screen and video from another of the plurality of cameras.

5. The agricultural round baler of claim 2, wherein one of the plurality of baler operating systems is one of a net feeding cutoff system and a twine feeding cutoff system.

6. The agricultural round baler of claim 5, wherein one of the plurality of cameras views the amount of remaining a netting or a twine.

7. The agricultural round baler of claim 1, wherein one of the plurality of cameras is a backup camera for viewing an area behind the baler housing.

8. The agricultural round baler of claim 1, wherein the baler application screen is a video from a crop inlet camera;
   wherein the first baler operating system is one of a net feeding cutoff system and a twine feeding cutoff system; and
   wherein the second baler operating system is a gate cylinder for opening a gate.

9. The agricultural round baler of claim 1, wherein, upon activation of a third of the plurality of the baler operating systems, the control system is configured to detect one or more signals from a corresponding third of the plurality of sensors and switch the display from displaying the third baler operating system, and upon termination of the third of the plurality of baler operating systems, switch the display from displaying the video from the third of the plurality of cameras to displaying at least one of the baler application screen and video from another of the plurality of cameras.

10. The agricultural round baler of claim 1, wherein the plurality of baler operating systems include:
   a pickup at the crop inlet;
   one of a net feeding cutoff system and a twine feeding cutoff system; and
   a gate cylinder for opening a gate.

11. An agricultural round baler, comprising:
   a baler housing defining a bale forming chamber;
   a plurality of baler operating systems mounted to the baler housing, each baler operating system being different from other of the plurality of baler operating systems;
   a plurality of cameras mounted to the baler housing and positioned to view the plurality of baler operating systems; and
   a control system including:
      a controller;
      a display operatively coupled to the controller and the plurality of cameras; and
      a plurality of sensors mounted to the baler housing and operatively coupled to the controller, the plurality of sensors sensing the actuation of the plurality of baler operating systems;
   wherein the control system is configured to display a baler application screen on the display, and wherein, upon activation of a first of the plurality of baler operating systems, the control system is configured to detect one or more signals from a corresponding first of the plurality of sensors and switch the display from displaying the baler application screen to displaying video from a corresponding first of the plurality of cameras during actuation of the first baler operating system, and upon termination of the first of the plurality of baler operating systems, switch the display from displaying the video from the first of the plurality of cameras to displaying at least one of the baler application screen and video from another of the plurality of cameras.

12. The agricultural round baler of claim 11, wherein, upon activation of a second of the plurality of the baler operating systems, the control system is configured to detect one or more signals from a corresponding second of the plurality of sensors and switch the display from displaying the second baler operating system, and upon termination of the second of the plurality of baler operating systems, switch the display from displaying the video from the second of the plurality of cameras to displaying at least one of the baler application screen and video from another of the plurality of cameras.

13. The agricultural round baler of claim 12, wherein, upon activation of a third of the plurality of the baler operating systems, the control system is configured to detect one or more signals from a corresponding third of the plurality of sensors and switch the display from displaying the third baler operating system, and upon termination of the third of the plurality of baler operating systems, switch the display from displaying the video from the third of the plurality of cameras to displaying at least one of the baler application screen and video from another of the plurality of cameras.

14. The agricultural round baler of claim 11, wherein the control system is configured to sequentially switch selectively between the plurality of cameras and the baler application image.

15. The agricultural round baler of claim 11, wherein the plurality of baler operating systems include:

a pickup at the crop inlet;
one of a net feeding cutoff system and a twine feeding cutoff system; and
a gate cylinder for opening a gate.

16. The agricultural round baler of claim of claim 15, wherein the control system sequentially shifts between a pickup at a crop inlet, one of a net feeding cutoff system and a twine feeding cutoff system, and a gate cylinder for opening a gate.

17. The agricultural round baler of claim 11, wherein at least one of the cameras is mounted to the interior of the baler housing.

18. The agricultural round baler of claim 11, wherein the baler application screen is a video of a crop inlet camera.

19. The agricultural round baler of claim 11, wherein one of the plurality of cameras is a backup camera for viewing an area behind the baler.

20. The agricultural round baler of claim 11, wherein one of the plurality of baler operating systems is one of a net feeding cutoff system and a twine feeding cutoff system; and
wherein one of the plurality of sensors detects actuation of the one of the net feeding cutoff system and the twine feeding cutoff system;
wherein one of the plurality of the cameras shows whether the one of the net feeding cutoff system and the twine feeding cutoff system is functioning property and shows the remaining amount of one of a net and a twine available.

* * * * *